United States Patent
Patel et al.

(10) Patent No.: US 12,370,996 B1
(45) Date of Patent: Jul. 29, 2025

(54) OPTIMAL FEEDFORWARD OBSERVER BASED CREEP CONTROL FOR ELECTRIFIED POWERTRAINS WITH A TORQUE CONVERTER OR A LAUNCH CLUTCH

(71) Applicant: FCA US LLC, Auburn Hills, MI (US)

(72) Inventors: Nadirsh D Patel, Auburn Hills, MI (US); Abdulquadri Oluwatobi Banuso, Auburn Hills, MI (US); Hangxing Sha, Auburn Hills, MI (US); Krishna Reddy Madireddy, Auburn Hills, MI (US); Indrasen Karogal, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/887,182

(22) Filed: Sep. 17, 2024

(51) Int. Cl.
  *B60W 50/00* (2006.01)
  *B60W 10/02* (2006.01)
  *B60W 10/08* (2006.01)
  *B60W 40/12* (2012.01)

(52) U.S. Cl.
  CPC ............ *B60W 10/02* (2013.01); *B60W 10/08* (2013.01); *B60W 40/12* (2013.01); *B60W 2050/0012* (2013.01); *B60W 2050/0017* (2013.01); *B60W 2050/0018* (2013.01); *B60W 2510/081* (2013.01); *B60W 2710/027* (2013.01); *B60W 2710/083* (2013.01)

(58) Field of Classification Search
  CPC ...... B60W 10/02; B60W 10/08; B60W 40/12; B60W 2050/0012; B60W 2050/0017; B60W 2050/0018; B60W 2510/081; B60W 2710/027; B60W 2710/083
  See application file for complete search history.

(56) References Cited

U.S. PATENT DOCUMENTS

| | | | |
|---|---|---|---|
| 11,007,878 B2 | 5/2021 | Kamino et al. | |
| 11,254,299 B2 | 2/2022 | Jungaberle et al. | |
| 11,440,418 B2 | 9/2022 | Otsubo et al. | |
| 11,904,837 B2 | 2/2024 | Takada et al. | |
| 2010/0105523 A1* | 4/2010 | Hrovat .................. | B60W 10/02 477/175 |

FOREIGN PATENT DOCUMENTS

| | | | |
|---|---|---|---|
| CN | 115967313 A | * | 4/2023 |
| CN | 117141578 A | * | 12/2023 |
| JP | 6157829 | | 7/2017 |
| WO | WO-2019185146 A1 | * | 10/2019 |

* cited by examiner

*Primary Examiner* — Justin Holmes
(74) *Attorney, Agent, or Firm* — Jeremy J. Klobucar

(57) ABSTRACT

A feedforward control method for an electrified powertrain including a torque transfer device arranged between an electric motor and a transmission includes monitoring a set of operating parameters of the electrified powertrain, determining a desired input speed for the torque transfer device based on the set of operating parameters, determining a desired input torque for the torque transfer device based on a characteristics model or map of the torque transfer device and the desired input speed, performing an observer-based determination of a final feedforward torque for the torque transfer device based on the desired input speed, the desired input torque, a filtered actuator achieved torque for the electric motor, and minimum and maximum torque limits for the transmission, and controlling the electric motor based on the final feedforward torque for the torque transfer device.

20 Claims, 6 Drawing Sheets

OPTIMAL FEEDFORWARD OBSERVER BASED CREEP CONTROL FOR ELECTRIFIED POWERTRAINS WITH A TORQUE CONVERTER OR A LAUNCH CLUTCH

FIELD

The present application generally relates to electrified vehicles and, more particularly, to optimal feedforward observer based creep control for electrified powertrains with a torque converter or a launch clutch.

BACKGROUND

Vehicle "creep" acceleration is a control problem where the primary goal is to maintain a steady forward torque at a constant speed to prevent the vehicle's actuators from stalling while in a drive mode. This is achieved by regulating the torque from the primary actuator based on a desired transmission input speed, which in turn ensures the vehicle maintains the intended creep speed and corresponding acceleration. This process is crucial for the smooth operation of the vehicle at low speeds or when initiating movement from a stationary position. In electrified powertrains with a torque converter or a launch clutch, an optimal load torque at this torque transfer device's input is crucial for efficient operation. Conventional solutions to compute this optimal load torque include (i) heuristic techniques, which require high calibration effort, and (ii) modeling from wheel to actuator, which does not account for variations that eventually wind-up a closed-loop controller. Accordingly, while these conventional solutions do work for their intended purpose, there exists an opportunity for improvement in the relevant art.

SUMMARY

According to one aspect of the invention, a feedforward control system for an electrified powertrain including a torque transfer device is presented. In one exemplary implementation, the system comprises a set of sensors configured to monitor a set of operating parameters of the electrified powertrain, wherein the electrified powertrain includes an electric motor connected to an input of the torque transfer device and a transmission connected between an output of the torque transfer device and a driveline and a control system configured to determine a desired input speed for the torque transfer device based on the set of operating parameters of the electrified powertrain, determine a desired input torque for the torque transfer device based on a characteristics model or map of the torque transfer device and the desired input speed, perform an observer-based determination of a final feedforward torque for the torque transfer device based on the desired input speed, the desired input torque, a filtered actuator achieved torque for the electric motor, and minimum and maximum torque limits for the transmission, and control the electric motor based on the final feedforward torque for the torque transfer device.

In some implementations, the control system is further configured to perform an observer-based determination of a raw feedforward torque based on the desired input speed, the desired input torque, and the filtered actuator achieved torque and apply the minimum and maximum torque limits for the transmission to the raw feedforward torque to obtain the final feedforward torque. In some implementations, the torque transfer device is a torque converter. In some implementations, the characteristics model or map is a forward torque converter (FTC) map or model that is configured to determine the desired input torque based on a turbine speed of the torque converter and the desired input speed. In some implementations, the control system is configured to perform the observer-based determination of the raw feedforward torque by utilizing an observer to estimate a torque acceleration based on the desired input speed, the desired input torque, and the filtered actuator achieved torque and calculating a sum of the desired input torque and the estimated torque acceleration to obtain the raw feedforward torque.

In some implementations, the torque transfer device is a launch clutch. In some implementations, the characteristics model or map is a feedforward gain model for the launch clutch that is configured to determine the desired input torque based on the desired input speed and a vehicle speed. In some implementations, the control system is configured to perform the observer-based determination of the raw feedforward torque by determining an actuator torque of the electric motor by summing the filtered achieved actuator torque and the desired input torque, solving an inertia-based relationship between the electric motor and the launch clutch including the determined actuator torque and a desired speed for the electric motor to obtain an input torque state for the launch clutch, and calculating a sum of the desired input torque and the input torque state to obtain the raw feedforward torque. In some implementations, the control system is configured to control the electric motor based on the final feedforward torque for the torque transfer device to provide optimal positive creep torque by the electrified powertrain. In some implementations, one of the set of operating parameters of the electrified powertrain is the enablement or activation of a creep mode.

According to another aspect of the invention, a feedforward control method for an electrified powertrain including a torque transfer device is presented. In one exemplary implementation, the method comprises monitoring, by control system and using a set of sensors, a set of operating parameters of the electrified powertrain, wherein the electrified powertrain includes an electric motor connected to an input of the torque transfer device and a transmission connected between an output of the torque transfer device and a driveline, determining, by the control system, a desired input speed for the torque transfer device based on the set of operating parameters of the electrified powertrain, determining, by the control system, a desired input torque for the torque transfer device based on a characteristics model or map of the torque transfer device and the desired input speed, performing, by the control system, an observer-based determination of a final feedforward torque for the torque transfer device based on the desired input speed, the desired input torque, a filtered actuator achieved torque for the electric motor, and minimum and maximum torque limits for the transmission, and controlling, by the control system, the electric motor based on the final feedforward torque for the torque transfer device.

In some implementations, the method further comprises performing, by the control system, an observer-based determination of a raw feedforward torque based on the desired input speed, the desired input torque, and the filtered actuator achieved torque and applying, by the control system, the minimum and maximum torque limits for the transmission to the raw feedforward torque to obtain the final feedforward torque. In some implementations, the torque transfer device is a torque converter. In some implementations, the characteristics model or map is an FTC map or model that is configured to determine the desired input torque based on a turbine speed of the torque converter and the desired input speed. In some implementations, the performing of the observer-based determination of the raw feedforward torque includes utilizing an observer to estimate a torque acceleration based on the desired input speed, the desired input torque, and the filtered actuator achieved torque and calculating a sum of the desired input torque and the estimated torque acceleration to obtain the raw feedforward torque.

In some implementations, the torque transfer device is a launch clutch. In some implementations, the characteristics model or map is a feedforward gain model for the launch clutch that is configured to determine the desired input torque based on the desired input speed and a vehicle speed. In some implementations, the performing of the observer-based determination of the raw feedforward torque includes determining an actuator torque of the electric motor by summing the filtered achieved actuator torque and the desired input torque, solving an inertia-based relationship between the electric motor and the launch clutch including the determined actuator torque and a desired speed for the electric motor to obtain an input torque state for the launch clutch, and calculating a sum of the desired input torque and the input torque state to obtain the raw feedforward torque. In some implementations, the controlling of the electric motor based on the final feedforward torque for the torque transfer device provides optimal positive creep torque by the electrified powertrain. In some implementations, one of the set of operating parameters of the electrified powertrain is the enablement or activation of a creep mode.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

Figure 1:
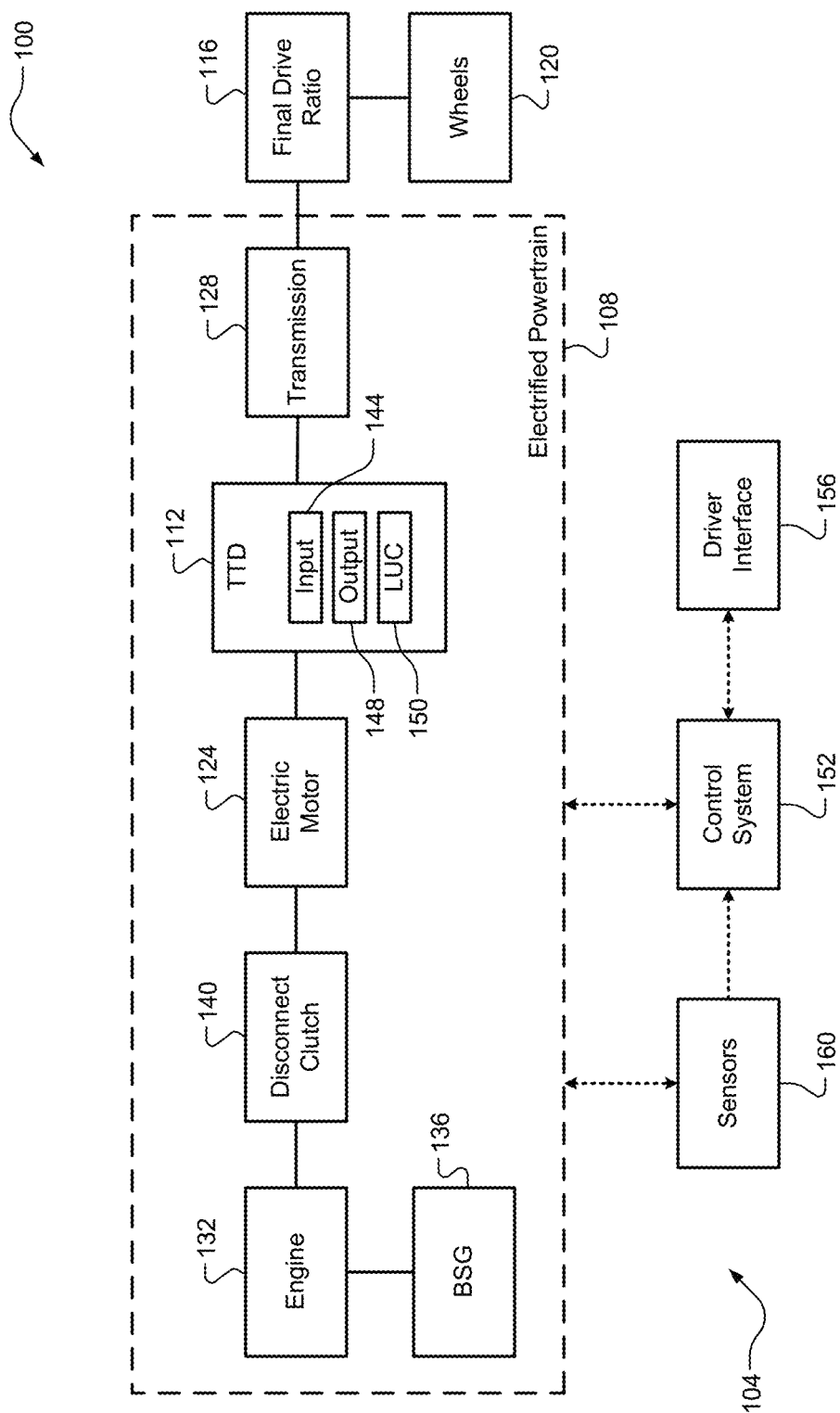
FIG. 1 is a functional block diagram depicting an example electrified powertrain including a torque transfer device and an example feedforward control system according to the principles of the present application.

As previously discussed, vehicle "creep" acceleration is a control problem where the primary goal is to maintain a steady forward torque at a constant speed to prevent the vehicle's actuators from stalling while in a drive mode. This is achieved by regulating the torque from the primary actuator based on a desired transmission input speed, which in turn ensures the vehicle maintains the intended creep speed and corresponding acceleration. This process is crucial for the smooth operation of the vehicle at low speeds or when initiating movement from a stationary position. In electrified powertrains with a torque converter or a launch clutch (collectively, a "torque transfer device"), an optimal load torque at the torque transfer device's input is crucial for efficient operation. This involves using a control structure with the torque transfer device's characteristics within a feedforward control loop, alongside a feedback controller. The goal is to regulate the input speed to match the target speed. Therefore, a sophisticated control algorithm is needed to compute the optimal load torque command at the torque transfer device's input, factoring in the nonlinear behavior of the torque transfer device and the primary actuator's response.

One conventional solution to this problem focuses solely on using heuristics techniques for the development of a torque transfer device model for feedforward control and a proportional-integral-derivative (PID) controller for feedback control of the actuator input speed to target transmission input speed. Heuristic strategies require a high calibration effort, and several conditions and rules might be needed to generate a torque transfer device model/map with satisfactory performance for all working conditions as part of a feedforward control loop. In addition, a simple PID does not consider the actual dynamics of the system, and due to the non-linearity of the powertrain and the torque transfer device, a heavily tuned feedback controller is needed which can significantly increases closed loop effort and typically leads to bad anti windup control. Other conventional methods have tried to model the system from the wheel to actuator. When modelling from wheel to actuator, they do not account for variations in road load, vehicle inertia, mass, transmission elements which eventually winds up the closed loop controller. Thus, while these conventional solutions do work for their intended purpose, an opportunity exists for improvement in the relevant art.

Accordingly, optimal feedforward control techniques for controlling the input speed of an electrified powertrain with a torque converter or a torque transfer device are presented herein. These feedforward control techniques utilize a model reference observer (e.g., part of a Kalman filter) for improved input speed actuation. One primary potential benefit of the techniques of the present application is that, by utilizing the desired input speed, a torque converter characteristics map/model (for a torque converter embodiment) or a feedforward gain model (for a launch clutch embodiment), and the actuator achieved torque as part of the feedforward control loop, an optimal and robust feedforward control torque command for the primary actuator (the electric motor) is obtainable, which can be utilized for control (of the torque transfer device input speed) to minimize closed-loop windup and provide consistent creep drivability feel and maneuvers. There are also other potential benefits resulting from the techniques of the present application.

More specifically, by utilizing a dynamic feedforward approach with an observer-based structure, the actuator has an improved response to tracking desired input speed and acceleration whilst providing a better drivability feel for creep controls from repeatability and consistency standpoint and less closed-loop, windup control with very good disturbance rejection. By taking into account the actuator-torque transfer device inertia-torque dynamics, a torque converter characteristics model/map or a feedforward gain model, and the achieved torque of the primary actuator, it takes advantage of the information for disturbance rejection and an observer structure to determine an optimal acceleration torque which are then summed up to determine an optimal load torque front feedforward command thus providing a higher level of overall torque management on the powertrain. For the customer, this means potential drivability improvements and consistent feel to different creep maneuvers with varying speed targets. Compared to previous or conventional solutions, the calibration effort is drastically reduced as the dynamics of the system are captured within the model.

Referring now to FIG. 1, a functional block diagram of an electrified vehicle 100 having an example feedforward control system 104 for an electrified powertrain 108 including a torque transfer device (TTD) 112 according to the principles of the present application is illustrated. The electrified powertrain 108 is configured to generate and transfer drive torque to a driveline (e.g., a final drive ratio 116 and wheels 120) for propulsion. As shown, the electrified powertrain 108 includes an electric motor 124 (e.g., a three-phase traction motor) connected to a transmission 128 (a multi-speed step gear transmission, a continuously variable transmission, etc.) with the torque converter 112 therebetween. The electrified powertrain 108 further includes an internal combustion engine 132 having a belt-driven starter-generator (BSG) system 136 coupled thereto (e.g., for engine stop-start control) with a disconnect or separation clutch 140 arranged between the electric motor 124 and the engine 132. While a series hybrid configuration is shown, it will be appreciated that the electrified powertrain 108 could have another suitable configuration that includes the torque transfer device 112. Speeds/torques of the various shafts of the electrified powertrain 108, as well as other suitable parameters (pressures, temperatures, etc.) and states of various devices (clutches, the transmission 128, etc.) are monitored by a set of sensors 160.

The torque transfer device 112 includes an input 144 driven by the electric motor 124 and an output 148 that drives the transmission 128. In one embodiment, the torque transfer device 112 is a torque converter, which is a fluid coupling where the input 144 includes an impeller that fluidly drives a turbine of the output 148. In another embodiment, the torque transfer device 112 is a launch clutch (e.g., a hydraulic friction clutch), where the input 144 includes an input friction element that engages with a second friction element of the output 148. In the torque converter embodiment, when the speeds of the impeller and the turbine are synchronized, a lock-up clutch (LUC) 150 could be engaged to physically connect the impeller and the turbine. For simplicity herein, the impeller/turbine may be referred to as impeller 144 and turbine 148 and the first/second friction elements may be referred to as friction elements 144 and 148. A controller or control system 152 controls operation of the electrified powertrain 108, which primarily includes controlling the electrified powertrain 108 to generate a desired amount of drive torque to satisfy a driver torque request (e.g., received via a driver interface 156, such as an accelerator pedal). The control system 152 also receives measured operating parameters, such as speeds/torques of the various rotating shafts and systems states (disconnect clutch state, transmission state, etc.). The control system 152 is configured to perform the feedforward control techniques of the input speed to the torque transfer device 112, which will now be discussed in greater detail below.

Figure 2:
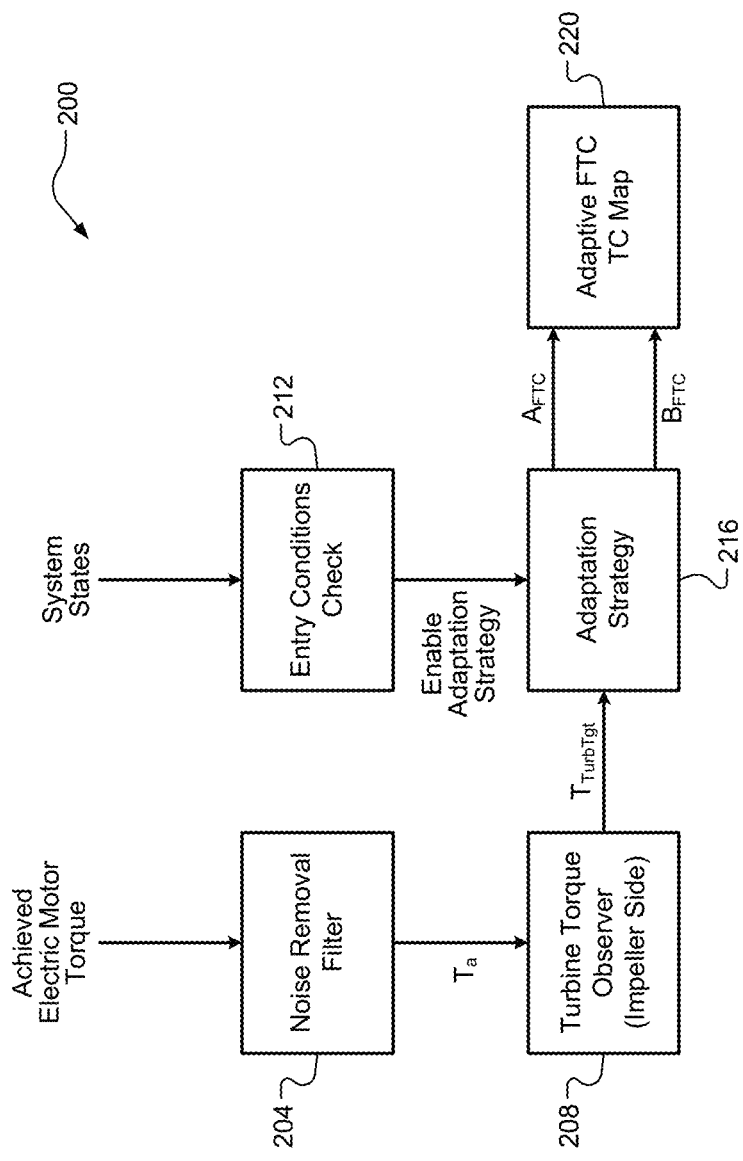
FIG. 2 is a functional block diagram depicting an example control architecture adaptive updating of a forward torque converter map or model according to the principles of the present application.

Referring now to FIGS. 2, 3, 4A-4B, and 5, and with continued reference to FIG. 1, functional block diagram depicting example system architectures 200, 400, 450, and 500 and a plot 300 of an example use case for the feedforward control system 104 according to the principles of the present application are illustrated. Referring first to FIG. 2, in the torque converter embodiment of the torque transfer device 112, the system 104 leverages a torque converter characteristics model/map (e.g., a static torque converter model/map), which is then used in the generation of an optimal feedforward control torque command, enabling the actuator (the electric motor 124) to reach the desired speed efficiently while reducing the feedback control effort, which can improve the overall performance and responsiveness of the electrified powertrain 108. In one embodiment, the torque converter characteristics model/map is adapted over time. By utilizing a dynamic feedforward control approach, that takes into the electric motor's achieved torque, the torque converter characteristics model/map, the torque converter's torque ratio, and the electric motor-torque converter inertia-torque dynamics, we can control the input speed of the electric motor 124 to deliver vehicle creep acceleration.

A filter 204 is used to remove the noise from the achieved electric motor torque ($T_a$) to provide a smooth torque response and for determining a turbine torque target ($T_{TurbTgt}$) to adapt the torque converter model towards, which is provided by a turbine torque observer 208 (from an impeller-side reference). By removing unwanted noise from the achieved electric motor torque signal, this filter 204 ensures that the output torque is smooth and consistent. This is particularly important where even minor fluctuations can lead to significant errors in the system's response. System states, such as the state of disconnect clutch 140 and a state of the transmission 128 (gear ratio, shift in-progress, etc.), are used as entry conditions by block 212 for enabling the adaptation framework. Electric motor torque Ta and input and output speeds of the torque converter are determined with an estimation algorithm. The parameters of the torque converter (TC) map are online identified and adapted with a Kalman filter using the torque converter inertia-torque dynamics to the varying operating conditions of the electrified powertrain 108.

Figure 3:
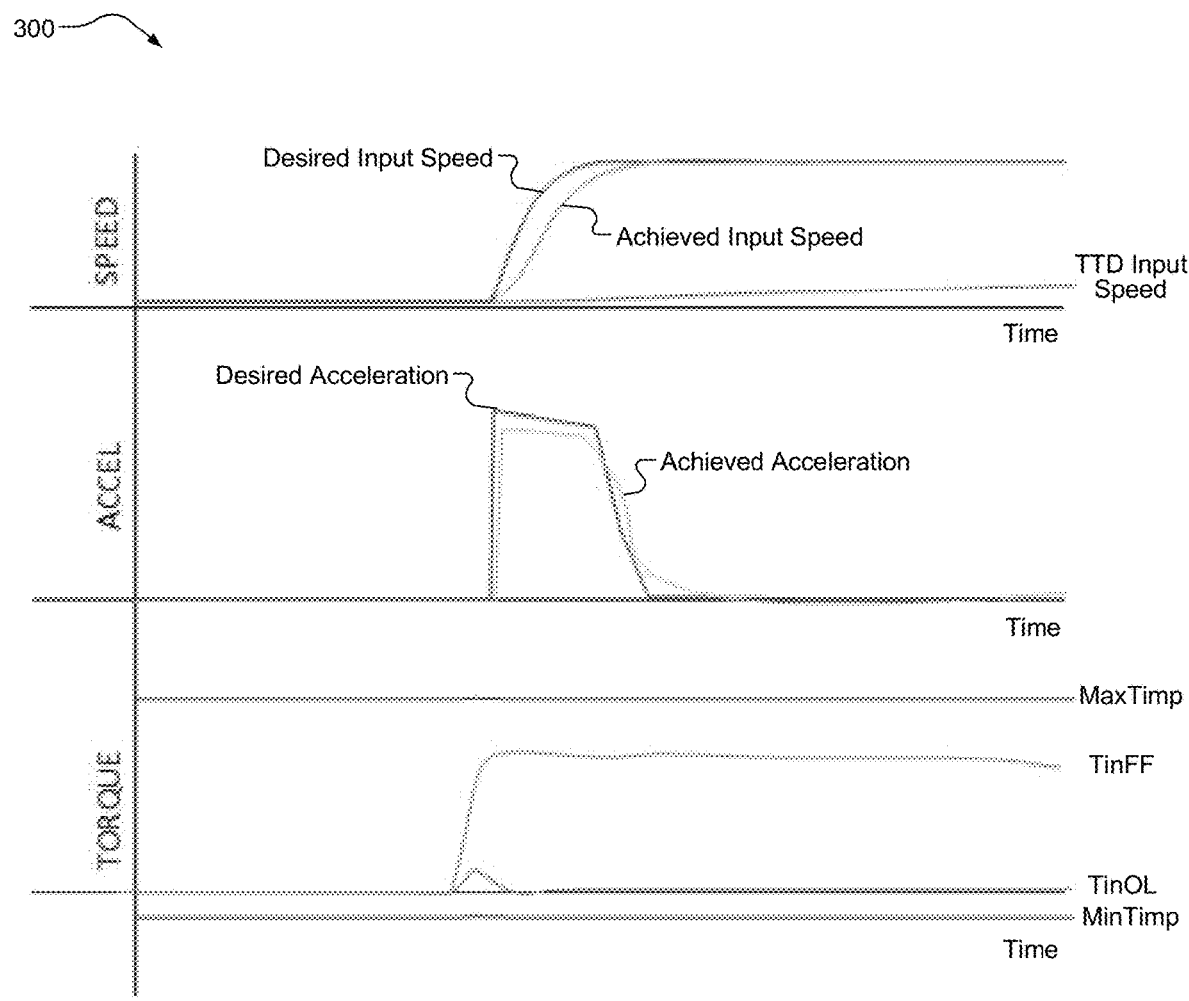
FIG. 3 is a plot depicting an example use case of the feedforward control method of an electrified powertrain including a torque transfer device according to the principles of the present application.

When the vehicle state is a creep mode (e.g., transmission in forward drive and no driver input via the brake/accelerator pedals), a desired transmission input speed is defined (NiProf) by a clutch control module 454, 504. Using a FTC characteristics TC map 404 or a feedforward gain model 508, a dynamic desired torque (TinOL) of the primary actuator (the electric motor 124) is calculated based on the desired input speed and the actual input speed of the torque transfer device 112 or the vehicle speed. An optimal feedforward actuator torque is determined by utilizing observer-based control block 466 or 520 based on the filtered input torque (TinFilt, by noise removal filter 462 or 516) and a torque demand from a torque demand module 458 or 512, which is minimum limited with the maximum transmission input torque (MaxTin) and maximum limited with the minimum transmission input torque (MinTin). A use case shown in the plot 300 of FIG. 3 illustrates a vehicle creep maneuver, where the clutch control module determines the desired input speed of the actuator at the input of the torque transfer device 112, with the input speed slowly increasing. A desired input speed (NiProf) is commanded, in which the actual speed sufficiently tracks with feedforward module described above, delivering most of the torque command (TinFF) with a minimal feedback control effort (TinOL).

In some embodiments, the techniques described herein may model a torque converter embodiment of the torque transfer device 112 using polynomial equations that will relate its output torque or turbine torque to the slip of the torque converter at a certain turbine speed. This approach is further enhanced with online parameter estimation to consider part variability, time changing effects such as temperature wear and tear of the components, transmission fluid viscosity etc. One unique aspect of the solution is the modeling approach using a polynomial fit, that can then be extended towards coefficient adaption to enable its use across a wide spectrum of vehicles. The dyno data of a torque converter is processed with a wide range of impeller-turbine speeds to reveal the polynomial relationship between the turbine torque and positive slip speed ($N_c$) at certain turbine speed ($N_{turbine}$) for the forward model. The polynomial fit accuracy is above 99.9%. The accuracy result indicates that it is reliable to use the equation:

$$T_{turbine} = A*N_c^2 + B*N_c \quad (1),$$

where $T_{turbine}$, A, B and $N_c$ represent turbine torque, the coefficients of the torque converter and they are function of turbine speed and slip speed, respectively.

To enhance the performance in static optimization requires the most accurate and current torque converter model. This is crucial for determining the optimal input speed needed. In dynamic optimization, especially for creep control within a feedforward-feedback control system, it is essential to calculate the transmission input actuator torque based on wheel input, considering various hybrid configurations that include a torque converter. With the updated A, B coefficients and polynomial equations, the torque path torque converter ring is calculating impeller torque and lock-up clutch torque based on the slip speed. With the more accurate forward torque converter model, more accurate lock up clutch torque is calculated, and it is further used to determine the actual status of the lock up clutch 150. And the reverse torque converter model is derived as:

$$N_c = \left\{ \frac{-B}{2A} + \sqrt{\frac{T_{Turb} + \frac{B^2}{4A}}{A}} \text{ or } \frac{-B}{2A} - \sqrt{\frac{T_{Turb} + \frac{B^2}{4A}}{A}} \right\}. \quad (2)$$

A Kalman filter may be chosen as the optimum filter due to its robustness to measurement variance. Impeller speed Nimp and turbine speed Nturb are used as inputs. A target turbine torque module (not shown) can outputs a target turbine torque ($T_{TurbTgt}$). The adaptation strategy with a torque trajectory is generated for the FTC adaptation. Based on a prediction module and a correction module of the Kalman filter, the coefficients are identified. A and B coefficients are calculated at the current operating points and are used as inputs to directly update the adaptive FTC look-up table.

With the standard parameter measurement output model defined as: $y = H\theta_k$ and the FTC model defined in equation (1), a mathematical relationship is expressed between the measurement output model and the FTC model as follows:

$$T_{Turbine} = [N_c^2 \ N_c] \begin{bmatrix} A \\ B \end{bmatrix} \quad (3)$$
$$y = H\theta_k$$
$$y = T_{turbine}$$
$$H = [N_c^2 \ N_c]$$
$$\theta = [A \ B]^T$$

where H represents the measurement function and θ represents the parameters. This adaptation strategy is setup to minimize the following objective problem:

$$J = \sum_{i=1}^{M} (y_k - \hat{y}_k)^2, \hat{y}_k = H\hat{\theta}_k, \quad (4)$$

where, J=cost function, ŷ=estimated output at the time step, k, and y=current output at the time step, k. To implement a KF based parameter estimation algorithm with the cost function defined in Equation (4), the KF is written to recognize the parameters of the dynamic polynomial FTC model as the states defined above, which is achieved by rewriting the state transition matrix and measurement output model as follows:

$$\theta_{k+1}\theta_k + w_k, y_k = H\theta_k + v_k \quad (5),$$

where, $w_k$, represents the system uncertainties with covariance matrix, $Q_k = E[(w_{\{k\}})w_k^T)]$ and $v_k$ is the measurement noise with covariance matrix $R_k = E[(v_k v_k^T)]$ which are presented as diagonal matrices of appropriate dimensions.

The parameters of the covariance matrices have an excessive influence on the response and KF convergence to true estimates, since the $Q_k$ indicates how much confidence is in initial parameter estimates and the $R_k$ indicates how much trust is in the measurement model $y_k$. The covariance matrices are typically manually iteratively tuned, which takes a lot of time and effort, but a better idea is to tune them using a swarm intelligence-based optimization algorithms, such as the particle swarm optimization and ant colony optimization. As discussed above, the Kalman filter can be broken down into prediction and correction modules. The Kalman filter algorithm can initialized and recursively calculates parameter estimates, $\hat{\theta}_k$, at every sampling step with the prediction and correction steps, which is then used to adapt the parameters of the FTC model in the adaptive FTC lookup table at the current operating points.

A mathematical model is established to represent the polynomial relationship between turbine torque and slip speed. The mathematical model is used in an FTC model to calculate current impeller torque based on known input speed and turbine speed and a reverse torque converter model to calculate target input speed to deliver driver torque request. The parameters of the polynomial torque converter model are online identified with a Kalman filter to adapt the model to the varying transient operating conditions of the powertrain. General steps used for torque converter adaptation will now be described. In general, all these steps are done in real-time in an efficient manner by the control system 152. First, a base torque converter sequence is carried out including generating steady-state torque converter parameters. Next, data preprocessing and selection for model generation is carried out. The polynomial model is then trained using least squares regression rules. Finally, the A and B coefficients of the FTC are updated (see block 220). The steady-state torque converter parameters are generated based on the dynamics of the torque converter.

Inputs can include, but are not limited to: desired turbine speed range, input speeds, desired speed ratio range (up to 1), K factor map, torque ratio (TR) map based on desired speed ratio range. Outputs can include, but are not limited to: map of impeller and turbine torque as a function of input speed and speed ratio maximum limited to actual physical maximum impeller and turbine torque achievable by the torque converter specifications, interpolated slip speed across turbine speed range. For the data preprocessing and selection for model generation step, the input include, but are not limited to: impeller and turbine torque map, input and turbine speeds range, slip speed range at different turbine speeds. For the training step, the model is optimized. Model is tuned to increase observability and robustness and reduce overfitting. The estimation is evaluated on untrained data to evaluate estimation performance. If certain performance thresholds (estimation performance, mean squared performance, etc.) are not satisfactory, the method returns to the previous model tuning step. Adaptation steps will now be described. The steps include a turbine torque observer, an entry conditions check, an adaptation process, and an updating of the A and B coefficients of the FTC.

For the turbine torque observer 208, the inputs can include, but are not limited to: turbine speed, input speed, input torque, torque ratio map as a function of input and turbine speed. The output can include the turbine torque target. For the entry conditions check 212, the inputs can include a clutch status, a speed ratio, a transmission status check (shifter in "drive", transmission not undergoing a shift), turbine torque target>0 with hysteresis. The outputs can include enable/disable adaption process. In the adaptation process, the turbine speed row search is used to find an upper and lower index that can be used as part of the measurement model formulation. The measurement model formulation is defined in relation to the FTC model. The estimation algorithm (e.g., Kalman filter) is used to estimate A and B coefficients based on turbine torque target and slip speed ($N_c$). Protection functions are carried out. For example, Y1>Y2>Y3 and quadratic gradient rules are used to determine constraints for the updated A and B curves that are quadratic and unique at different turbine speeds. The quadratic rule checks the minimum of the line to confirm that it is less than 0 if the A coefficient is less than 0 which represents an upward opening curve. If the A coefficient is positive, then it is a downward opening curve. The maximum point is evaluated to confirm that it is greater than the "box" maximum so the window of slip speed is not crossed. The FTC is updated with updated A and B coefficients to determine turbine speed. The outputs include A and B coefficients of the FTC.

Figure 4A:
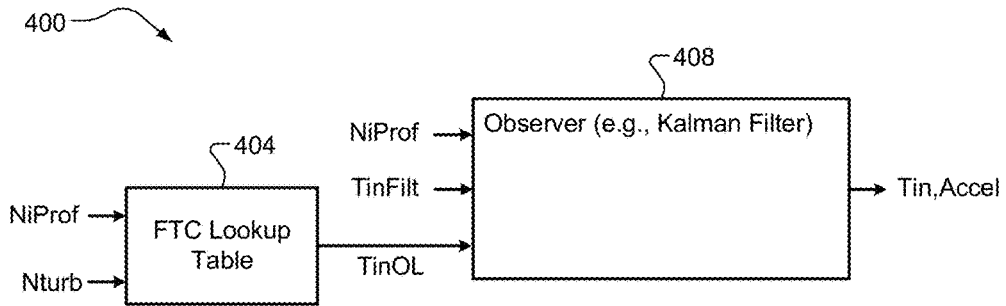
FIGS. 4A-4B are functional block diagrams depicting example control architectures for a torque converter embodiment of the feedforward control system according to the principles of the present application.
Figure 4B:
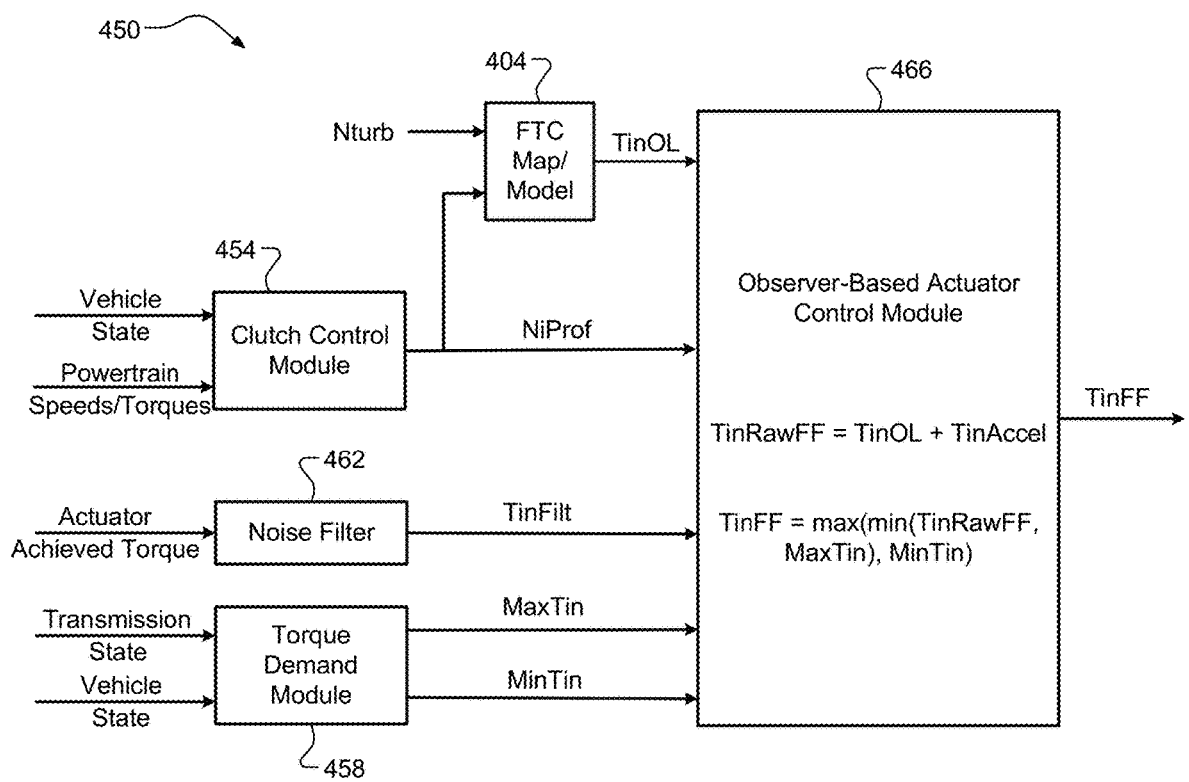

In the torque converter embodiment of FIGS. 4A-4B, two subsystems 400, 450 for a feedforward control approach for transmission input torque determination are illustrated. In FIG. 4A, the FTC map/model 404 (e.g., adapted FTC lookup table 220 from FIG. 2) is used to determine a desired input torque (TinOL) based on the turbine speed Nturb and the desired input speed (NiProf) determined by the clutch control module 454. This desired input torque TinOL is fed along with a filtered actuator achieved torque (TinFilt) from a noise removal filter 462 and the desired input speed NiProf to an observer 408 (e.g., a Kalman filter), which observes these inputs to estimate and output a torque acceleration (TinAccel). In FIG. 4B, the clutch control module 454 determines the desired input speed NiProf based on the vehicle state and other powertrain speeds/torques as discussed herein. The torque demand module 458 determines minimum and maximum torque transfer device torques (MinTin, MaxTin) based on the transmission state and other vehicle states (e.g., clutch states).

The FTC map/model 404, as previously discussed, calculates the desired input torque TinOL for the torque converter based on the turbine speed Nturb and the desired input speed NiProf. The desired input torque TinOL, the desired input speed NiProf, the filtered actuator achieved torque TinFilt, and the minimum and maximum impeller torques MinTin, MaxTin are all fed to the observer-based actuator control module 466, which executes the feedforward control strategy as illustrated. This includes calculating the raw feedforward impeller torque (TinRawFF) as a sum of the desired input torque TinOL and the acceleration torque TinAccel (calculated in FIG. 4A) and then calculating the feedforward impeller torque (TinFF) as a maximum of a minimum of the raw feedforward impeller torque TinRawFF and the minimum and maximum torques MinTin, MaxTin. The calculated feedforward torque TinFF can then be utilized for feedforward control of the input torque to the torque converter (e.g., the electric motor's output torque) and, in turn, the input torque to the transmission 128, for optimized creep control.

Figure 5:
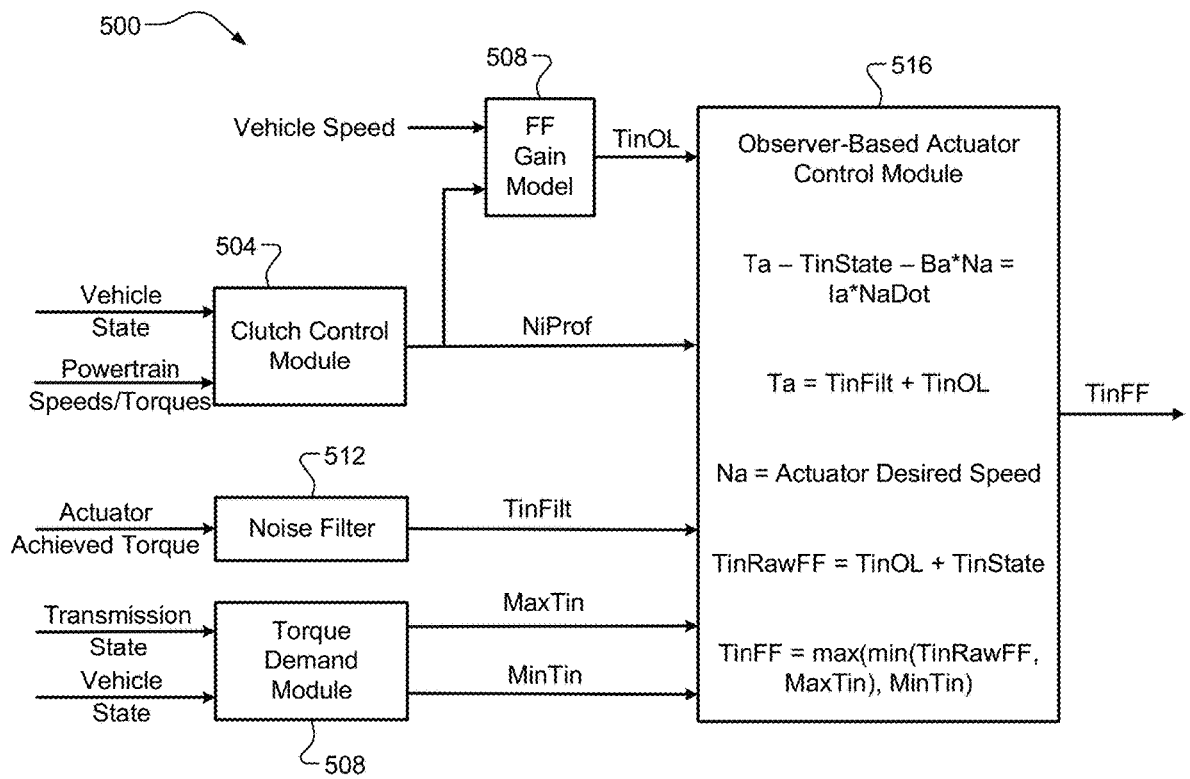
FIG. 5 is a functional block diagram depicting another example control architecture for a launch clutch embodiment of the feedforward control system according to the principles of the present application.

In the launch clutch embodiment of FIG. 5, there is no FTC map/model as there is no torque converter. Instead, a FF gain model 508 is utilized for this launch clutch embodiment. A clutch control module 504 calculates the desired input speed NiProf similar to as described above. A torque demand module 508 determines the minimum and maximum torque limits MaxTin and MinTin similar to as described above. A noise removal filter module 512 removes or filters noise from the actuator achieved torque to output the filtered input torque TinFilt similar to as described above. The FF gain model 508 receives the desired input speed NiProf and the vehicle speed as inputs and applies a feedforward gain model to generate and output the desired input torque TinOL. The desired input torque TinOL, the desired input speed NiProf, the filtered actuator achieved torque TinFilt, and the torque limits MaxTin, MinTin are all fed to an observer-based actuator control module 516.

First, a relationship between the electric motor's inertia (Ia) and its speed change (NaDot) to the electric motor's torque (Ta), an input torque (TinState) for the torque transfer device 112, and a desired speed of the electric motor 124 (Na), along with a constant (Ba), is provided and utilized to determine the input torque TinState. The electric motor's torque Ta is obtained as a sum of the filtered actuator achieved torque TinFilt and the desired input torque TinOL. A raw feedforward torque TinRawFF is then obtained as a sum of the desired input torque TinOL and the input torque TinState. Finally, the final feedforward torque TinFF is obtained as a maximum of a minimum of the raw feedforward torque TinRawFF and the minimum and maximum torques MinTin, MaxTin. The final feedforward torque TinFF can then be utilized for feedforward control of the input torque to the launch clutch (e.g., the electric motor's output torque) and, in turn, the input torque to the transmission 128, for optimized creep control.

Figure 6:
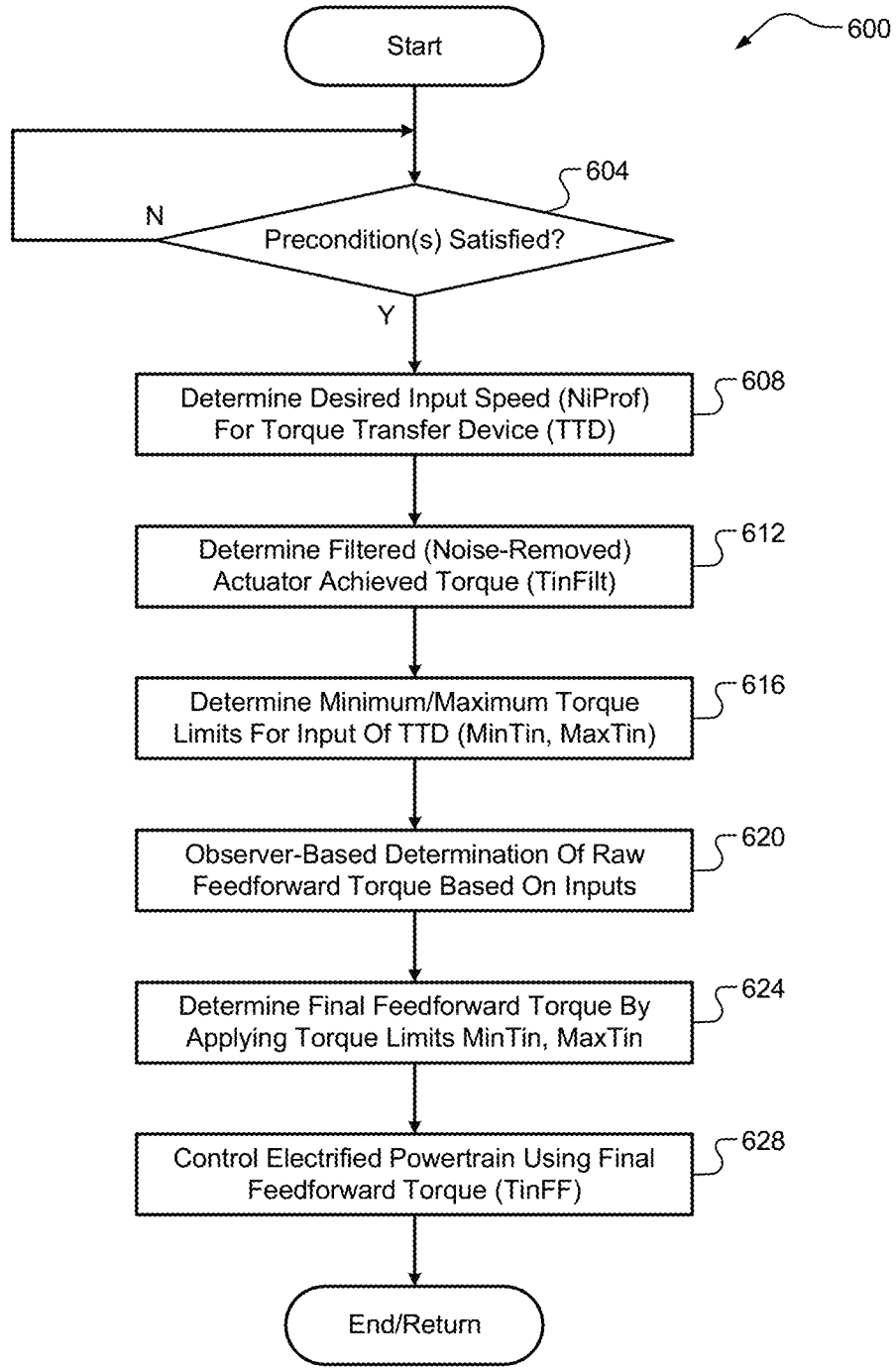
FIG. 6 is a flow diagram depicting an example feedforward control method of an electrified powertrain including a torque converter or a launch clutch according to the principles of the present application.

Referring now to FIG. 6, a flow diagram depicting an example feedforward control method 600 for an electrified powertrain including a torque converter according to the principles of the present application is illustrated. While the electrified powertrain 108 and its components are specifically referenced for descriptive/illustrative purposes, it will be appreciated that the method 600 could be applicable to any suitable configured electrified powertrain having a torque converter. The method 600 begins at optional 604 where it is determined whether one or more optional preconditions are satisfied. These precondition(s) could include, for example only, the vehicle 100 being powered up and the electrified powertrain 108 being operational and there being no malfunctions or faults present that would negatively affect or otherwise impact the operation of the techniques of the present application. In one exemplary implementation, one of the precondition(s) could be the vehicle being in a creep mode where a desired positive creep torque is to be provided. When false, the method 600 ends or returns to 604. When true, the method 600 proceeds to 608.

At 508, the control system 152 determines the desired input speed NiProf for the torque transfer device 112 based on a set of powertrain speeds/torques and the vehicle state (e.g., a state of disconnect clutch 140). At 612, the control system 512 determines the filtered actuator achieved torque TinFilt by applying a noise removal filter. At 616, the control system 152 determines the minimum and maximum torques MinTin, MaxTin for the input 144 of the torque transfer device 112 based on a state of the transmission 128 connected to the output 148 of the torque transfer device 112 and the vehicle state. At 620, the control system 152 performs an observer-based determination of a raw feedforward torque TinRawFF for the input 144 of the torque transfer device 112 as shown in FIGS. 4A-4B or FIG. 5, depending on whether the torque transfer device 112 is a torque converter or a launch clutch. At 624, the control system 152 determines a final feedforward torque TinFF for the input 144 of the torque transfer device 112 based on the raw feedforward torque TinRawFF and the minimum and maximum impeller torques MinTin, MaxTin. At 628, the control system 152 performs feedforward control of the input speed (e.g., the electric motor 124) to the torque transfer device 112 based on the final feedforward torque TinFF to provide the optimal creep control. This could also further include small feedback control loop adjustments as shown in FIG. 3. The method 600 then ends or returns to 604.

It will be appreciated that the terms "controller" and "control system" as used herein refer to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A feedforward control system for an electrified powertrain including a torque transfer device, the system comprising:
   a set of sensors configured to monitor a set of operating parameters of the electrified powertrain, wherein the electrified powertrain includes an electric motor connected to an input of the torque transfer device and a transmission connected between an output of the torque transfer device and a driveline; and
   a control system configured to:
      determine a desired input speed for the torque transfer device based on the set of operating parameters of the electrified powertrain;
      determine a desired input torque for the torque transfer device based on a characteristics model or map of the torque transfer device and the desired input speed;
      perform an observer-based determination of a final feedforward torque for the torque transfer device based on the desired input speed, the desired input torque, a filtered actuator achieved torque for the electric motor, and minimum and maximum torque limits for the transmission; and
      control the electric motor based on the final feedforward torque for the torque transfer device.

2. The system of claim 1, wherein the control system is further configured to:
   perform an observer-based determination of a raw feedforward torque based on the desired input speed, the desired input torque, and the filtered actuator achieved torque; and
   apply the minimum and maximum torque limits for the transmission to the raw feedforward torque to obtain the final feedforward torque.

3. The system of claim 2, wherein the torque transfer device is a torque converter.

4. The system of claim 3, wherein the characteristics model or map is a forward torque converter (FTC) map or model that is configured to determine the desired input torque based on a turbine speed of the torque converter and the desired input speed.

5. The system of claim 4, wherein the control system is configured to perform the observer-based determination of the raw feedforward torque by:
   utilizing an observer to estimate a torque acceleration based on the desired input speed, the desired input torque, and the filtered actuator achieved torque; and
   calculating a sum of the desired input torque and the estimated torque acceleration to obtain the raw feedforward torque.

6. The system of claim 2, wherein the torque transfer device is a launch clutch.

7. The system of claim 6, wherein the characteristics model or map is a feedforward gain model for the launch clutch that is configured to determine the desired input torque based on the desired input speed and a vehicle speed.

8. The system of claim 7, wherein the control system is configured to perform the observer-based determination of the raw feedforward torque by:
- determining an actuator torque of the electric motor by summing the filtered achieved actuator torque and the desired input torque;
- solving an inertia-based relationship between the electric motor and the launch clutch including the determined actuator torque and a desired speed for the electric motor to obtain an input torque state for the launch clutch; and
- calculating a sum of the desired input torque and the input torque state to obtain the raw feedforward torque.

9. The system of claim 1, wherein the control system is configured to control the electric motor based on the final feedforward torque for the torque transfer device to provide optimal positive creep torque by the electrified powertrain.

10. The system of claim 9, wherein one of the set of operating parameters of the electrified powertrain is the enablement or activation of a creep mode.

11. A feedforward control method for an electrified powertrain including a torque transfer device, the method comprising:
- monitoring, by control system and using a set of sensors, a set of operating parameters of the electrified powertrain, wherein the electrified powertrain includes an electric motor connected to an input of the torque transfer device and a transmission connected between an output of the torque transfer device and a driveline;
- determining, by the control system, a desired input speed for the torque transfer device based on the set of operating parameters of the electrified powertrain;
- determining, by the control system, a desired input torque for the torque transfer device based on a characteristics model or map of the torque transfer device and the desired input speed;
- performing, by the control system, an observer-based determination of a final feedforward torque for the torque transfer device based on the desired input speed, the desired input torque, a filtered actuator achieved torque for the electric motor, and minimum and maximum torque limits for the transmission; and
- controlling, by the control system, the electric motor based on the final feedforward torque for the torque transfer device.

12. The method of claim 11, further comprising:
- performing, by the control system, an observer-based determination of a raw feedforward torque based on the desired input speed, the desired input torque, and the filtered actuator achieved torque; and
- applying, by the control system, the minimum and maximum torque limits for the transmission to the raw feedforward torque to obtain the final feedforward torque.

13. The method of claim 12, wherein the torque transfer device is a torque converter.

14. The method of claim 13, wherein the characteristics model or map is a forward torque converter (FTC) map or model that is configured to determine the desired input torque based on a turbine speed of the torque converter and the desired input speed.

15. The method of claim 14, wherein the performing of the observer-based determination of the raw feedforward torque includes:
- utilizing an observer to estimate a torque acceleration based on the desired input speed, the desired input torque, and the filtered actuator achieved torque; and
- calculating a sum of the desired input torque and the estimated torque acceleration to obtain the raw feedforward torque.

16. The method of claim 12, wherein the torque transfer device is a launch clutch.

17. The method of claim 16, wherein the characteristics model or map is a feedforward gain model for the launch clutch that is configured to determine the desired input torque based on the desired input speed and a vehicle speed.

18. The method of claim 17, wherein the performing of the observer-based determination of the raw feedforward torque includes:
- determining an actuator torque of the electric motor by summing the filtered achieved actuator torque and the desired input torque;
- solving an inertia-based relationship between the electric motor and the launch clutch including the determined actuator torque and a desired speed for the electric motor to obtain an input torque state for the launch clutch; and
- calculating a sum of the desired input torque and the input torque state to obtain the raw feedforward torque.

19. The method of claim 11, wherein the controlling of the electric motor based on the final feedforward torque for the torque transfer device provides optimal positive creep torque by the electrified powertrain.

20. The method of claim 19, wherein one of the set of operating parameters of the electrified powertrain is the enablement or activation of a creep mode.

* * * * *